(No Model.)

H. A. MOYER.
SPRING VEHICLE.

No. 357,780. Patented Feb. 15, 1887.

WITNESSES:
C. Bendixon
A. F. Walz

INVENTOR
Harvey A. Moyer
BY
Duell, Laass & Duell
ATTORNEYS

UNITED STATES PATENT OFFICE.

HARVEY A. MOYER, OF SYRACUSE, NEW YORK.

SPRING-VEHICLE.

SPECIFICATION forming part of Letters Patent No. 357,780, dated February 15, 1887.

Application filed October 2, 1886. Serial No. 215,124. (No model.)

*To all whom it may concern:*

Be it known that I, HARVEY A. MOYER, of Syracuse, in the county of Onondaga, in the State of New York, have invented new and useful Improvements in Spring-Vehicles, of which the following, taken in connection with the accompanying drawings, is a full, clear, and exact description.

This invention consists in novel, simple, and effective means for connecting cross-springs or end springs to the running-gears of buckboards and other inexpensive vehicles, all as hereinafter more fully described, and specifically set forth in the claims.

Figure 1:
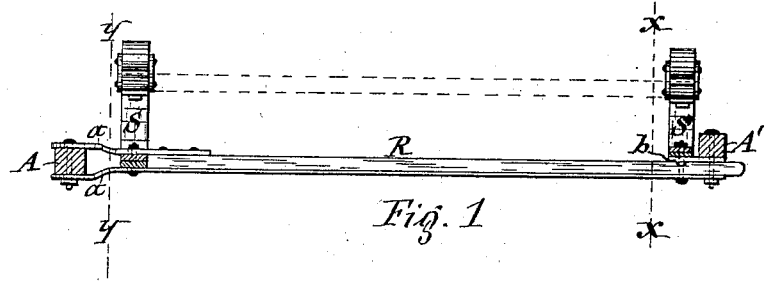
Figure 3:
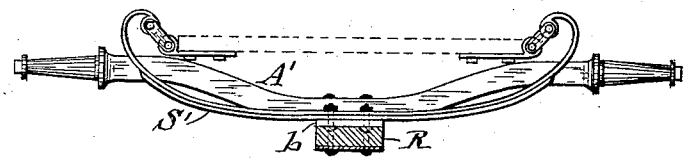
Figure 2:
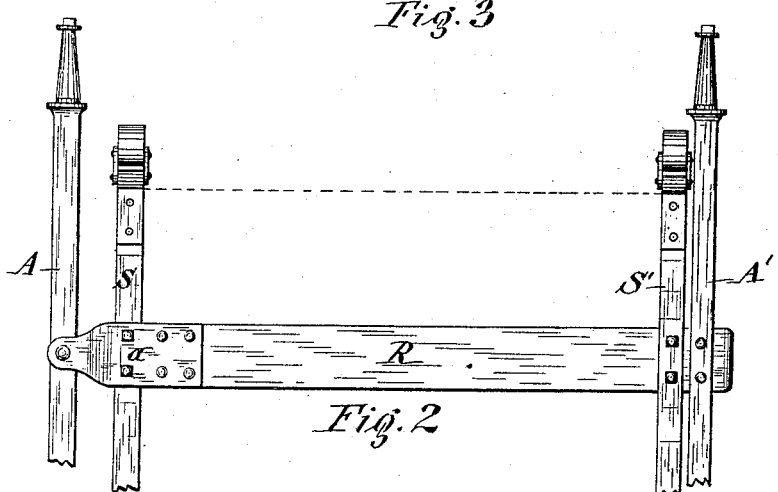
Figure 4:
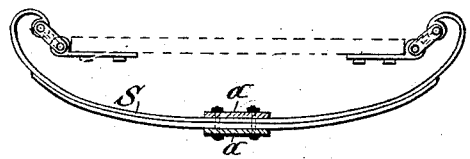

In the annexed drawings, Figure 1 is a vertical longitudinal section of my improved vehicle without its wheels. Fig. 2 is a top plan view of the same with portions of the axles and springs broken away. Fig. 3 is a vertical transverse-section on line $x\ x$, Fig. 1; and Fig. 4 is a vertical transverse section on line $y\ y$, Fig. 1.

Similar letters of reference indicate corresponding parts.

A and A' represent, respectively, the forward and rear axles of the vehicle, and R denotes the reach, which in this case I prefer to make somewhat wider than ordinary reaches, for the purpose hereinafter explained. The wooden portion of the reach terminates back of the forward axle, and is connected therewith by metallic coupling-arms $a\ a$, secured to the wooden portion of the reach, and projecting, respectively, across the bottom and top of the axle, and having the king-bolt passing through them. If, however, a fifth-wheel and head-block are mounted on the said axle, the upper arm $a$ is to be connected with either the bolster or the upper circle of the fifth-wheel. Back of the forward axle, and adjacent to the end of the wooden portion of the reach, I secure between the two coupling-arms $a\ a$ the cross-spring S by bolts passing through the coupling-arms and intervening portion of the spring, or by other suitable and well-known means. The widened reach permits of the use of correspondingly-widened coupling-arms $a\ a$, to afford a proper bearing for the spring. Said spring may be either of the elliptic or semi-elliptic or other suitable and well-known type. A similar spring, S', I connect to the rear axle, A', and preferably to the forward side thereof, by means of a plate, $b$, which is bolted or otherwise rigidly secured to the central portion of the under side of said axle and projects from the forward side thereof; and on the projecting portion of said plate I secure the cross-spring S', either by bolting it thereon or by other suitable and well-known fastenings. The rear end of the reach is extended under the plate $b$, and secured in position by the bolts which fasten the plate $b$ on the axle.

I prefer to place the springs back of the forward axle and forward of the rear axle, so as to partly conceal the springs by the axles, and thus impart a neat and compact appearance to the vehicle, and also allow the body to be terminated between the springs, and thus to be hung as low as possible.

Having described my invention, what I claim is—

1. In combination with the front running-gear, the reach having its wooden portion terminated some distance back of the axle and connected therewith by metallic coupling-arms projecting from said wooden portion of the reach and lying directly across the top and bottom of the axle, and a cross-spring arranged back of said axle and secured between the coupling-arms of the reach in front of the wooden portion of the reach, substantially as described and shown.

2. In combination with the two axles and central reach, R, extending under the rear axle, a plate secured between the under side of the axle and subjacent portion of the reach and projecting forward from the axle, and a cross-spring in proximity to the front of the rear axle and secured to the aforesaid plate, substantially in the manner specified and shown.

In testimony whereof I have hereunto signed my name and affixed my seal, in the presence of two attesting witnesses, at Syracuse, in the county of Onondaga, in the State of New York, this 30th day of September, 1886.

HARVEY A. MOYER. [L. S.]

Witnesses:
H. P. DENISON,
C. H. DUELL.